US012586082B2

(12) United States Patent
Tieng et al.

(10) Patent No.: US 12,586,082 B2
(45) Date of Patent: Mar. 24, 2026

(54) HYBRID SYSTEM AND METHOD OF CARBON AND ENERGY MANAGEMENTS FOR GREEN INTELLIGENT MANUFACTURING

(71) Applicant: NATIONAL CHENG KUNG UNIVERSITY, Tainan City (TW)

(72) Inventors: Hao Tieng, Tainan City (TW); Fan-Tien Cheng, Tainan City (TW); Ting-Chia Ou, Tainan City (TW); Tsung-Han Tsai, Tainan City (TW); Yu-Yong Li, Tainan City (TW)

(73) Assignee: National Cheng Kung University, Tainan City (TW)

( * ) Notice: Subject to any disclaimer, the term of this patent is extended or adjusted under 35 U.S.C. 154(b) by 704 days.

(21) Appl. No.: 18/051,525

(22) Filed: Nov. 1, 2022

(65) Prior Publication Data

US 2024/0095755 A1     Mar. 21, 2024

(30) Foreign Application Priority Data

Sep. 16, 2022     (TW) .................................. 111135113

(51) Int. Cl.
G06Q 10/0631 (2023.01)
G05B 15/02 (2006.01)
(Continued)

(52) U.S. Cl.
CPC ........... G06Q 30/018 (2013.01); G05B 15/02 (2013.01); G05B 19/4188 (2013.01);
(Continued)

(58) Field of Classification Search
USPC .......................................................... 700/28
See application file for complete search history.

(56) References Cited

U.S. PATENT DOCUMENTS 10,618,137 B2     4/2020   Chen et al.
2013/0116803 A1*  5/2013   Gmach ................ G05B 19/042
                                                            700/33
(Continued)

FOREIGN PATENT DOCUMENTS

CN        113888132 A   *  1/2022   ......... G06F 16/2462

OTHER PUBLICATIONS

Da-sheng Lee et al., "Universal workflow of artificial intelligence for energy saving," Energy Reports, pp. 1602-1633, vol. 8, Nov. 2022.

(Continued)

*Primary Examiner* — Emilio J Saavedra
(74) *Attorney, Agent, or Firm* — CKC & Partners Co., LLC

(57)     ABSTRACT

A hybrid method for green intelligent manufacturing (GiM) combines the carbon reduction and the energy saving into the intelligent manufacturing based Industry 4.1 cloud platform. GiM assists companies to achieve the goal of net zero transition and help them advance to Industry 4.2 as soon as possible by simultaneously taking carbon footprint and energy issues into account. GiM collects large volumes of essential data (including carbon footprint) via cyber physical agents (CPAs), and sends them to two critical services of carbon management and intelligent energy management system (iEMS) deployed on the cloud platform. The two critical services optimize the energy dispatch schedule by strictly following the requirements of energy saving, carbon reduction, and net zero. Then, the state of zero defects of intelligent manufacturing achieved in Industry 4.1 can be upgraded to net zero of GiM in Industry 4.2.

14 Claims, 7 Drawing Sheets

(51) Int. Cl.

| | |
|---|---|
| *G05B 19/418* | (2006.01) |
| *G06Q 30/018* | (2023.01) |
| *G06Q 30/08* | (2012.01) |
| *G06Q 50/04* | (2012.01) |
| *G06Q 50/06* | (2012.01) |

(52) U.S. Cl.
CPC ....... *G06Q 10/06313* (2013.01); *G06Q 30/08* (2013.01); *G06Q 50/04* (2013.01); *G06Q 50/06* (2013.01)

(56) References Cited

U.S. PATENT DOCUMENTS

| | | | | |
|---|---|---|---|---|
| 2018/0278494 A1* | 9/2018 | Chen | ................. | B23Q 17/0971 |
| 2022/0381471 A1* | 12/2022 | Wenzel | ................... | F24F 11/47 |
| 2024/0004373 A1* | 1/2024 | Kozakai | ............ | G06Q 30/0201 |
| 2024/0295863 A1* | 9/2024 | O'Nien | ........... | G06Q 10/06375 |
| 2025/0209470 A1* | 6/2025 | Hamlin | ............... | G06Q 30/012 |

OTHER PUBLICATIONS

Shengchao Zhou et al., "A multi-objective differential evolution algorithm for parallel batch processing machine scheduling considering electricity consumption cost," Computers & Operations Research, pp. 55-68, vol. 96, Aug. 2018.

\* cited by examiner

HYBRID SYSTEM AND METHOD OF CARBON AND ENERGY MANAGEMENTS FOR GREEN INTELLIGENT MANUFACTURING

RELATED APPLICATIONS

This application claims priority to Taiwan Application Serial Number 111135113 filed Sep. 16, 2022, which is herein incorporated by reference.

BACKGROUND

Technical Field

The invention relates to systems and methods for green intelligent manufacturing, and more particularly to a hybrid system and method of carbon and energy managements for green intelligent manufacturing.

Description of Related Art

In order to pursue net zero, the current calculation software for carbon footprint related information is mostly defined and inventoried manually in order to comply with ISO14064 and ISO14067; and energy management software allocates energy for factory equipment or production/processing equipment by installing meters, both of which mainly operate independently.

The current mainstream approach to implementing net zero has the following issues: (1) the calculation of carbon footprint is imprecise. At present stage, the machine operation ratio is estimated manually from carbon inventory to carbon calculation, and then the carbon emission calculation of the product is inferred, which is easy to lead to the problem that the calculation is not objective and accurate. (2) energy management systems are not effectively integrated with carbon footprint. At present stage, conventional energy management systems rarely consider carbon footprint information synchronously, but the relationship between energy consumption and carbon footprint is closely related. (3) intelligent manufacturing is not effectively integrated with net zero. Overview the current research and development process of net zero technology around the world, most of them focus on green buildings, supply chain or carbon management or energy management system for factory equipment at production base, the intelligent manufacturing of processing behavior in the production base is rarely discussed. The main reason is that the operation mode of the production base is complex, involving production schedule, factory schedule, environmental factors, and a large amount of external information, which influence each other during the period. Moreover, energy consumption and carbon emission of production base account for a large part, but the two are not effectively integrated.

It can be seen that there is currently a lack of a hybrid system and method of carbon and energy managements for green intelligent manufacturing that intelligent manufacturing, energy management and carbon management are considered and integrated simultaneously. Therefore, the relevant industry is searching for its solution.

SUMMARY

Therefore, the purpose of the invention is to provide a hybrid system and method of carbon and energy management for green intelligent manufacturing (GiM), which utilizes GiM hybrid architecture to quickly and effectively collect relevant data of factory equipment and production equipment through cyber physical agents (CPAs), and the carbon footprint information is integrated into the intelligent energy management after performing the carbon footprint calculation through the intelligent carbon management. The current problem that the information calculation of carbon footprint cannot be effectively integrated with the energy management system software can be solved, helping enterprises to meet the premise of net zero while realizing the issues of intelligent manufacturing and energy management. Therefore, both energy saving and carbon reduction with green sustainability are taken into account.

According to an embodiment of structural aspect of the present invention, a hybrid system of carbon and energy management for green intelligent manufacturing is provided, which includes a manufacturing device, a plurality of CPAs, and a cloud platform. The manufacturing device includes factory equipment and production equipment. The plurality of CPAs communicatively connected to the manufacturing device and configured to collect a plurality of data sources. The plurality of data sources include enterprise organization information, supervisory control and data acquisition (SCADA) information, microgrid (MG) information, environmental information and production line information. The SCADA information comes from the factory equipment, and the production line information comes from the production equipment. The cloud platform communicatively connected to the plurality of CPAs and configured to perform operations including: performing operations of carbon disclosure, carbon reduction, carbon neutrality, energy consumption prediction, intelligent factory planning, intelligent microgrid integration and net zero confirmation. Among them, the carbon disclosure operation includes obtaining an inventory data by performing carbon inventory on the manufacturing device, and then providing the inventory data to the plurality of CPAs, and generating product raw material information corresponding to a product, and the inventory data includes a carbon emission. The carbon reduction operation includes improving a manufacturing process of the product based on the product raw material information so as to reduce the carbon emission. The carbon neutrality operation includes realizing a net zero principle according to a low-carbon energy allocation method when the carbon emission no longer be reduced through a product process planning at a present stage, wherein the low-carbon energy allocation method includes a carbon credit or a carbon offset. The energy consumption prediction operation includes predicting an energy consumption of all equipment in a factory or the manufacturing device during a specific time period through the data sources. The intelligent factory planning operation includes planning the product process planning with a minimum cost according to the energy consumption predicted by the energy consumption prediction operation and the carbon emission of the carbon reduction operation, and optimized factory equipment parameters and an optimized production schedule planned in accordance with the product process planning. The intelligent microgrid integration operation includes formulating an optimized energy distribution for a plurality of power generation equipment of the factory in accordance with the product process planning so as to dynamically dispatch an energy distribution ratio of the plurality of power generation equipment within the specific time period. The net zero confirmation operation includes confirming whether the product process planning and the low-carbon energy allocation method comply with the net zero principle and generating a confirmation result, and then deciding whether to re-perform carbon neutrality operation in accordance with the confirmation result so as to realize the net zero principle.

Therefore, the hybrid system of carbon and energy management for green intelligent manufacturing of the present invention, which utilizes GiM hybrid architecture to collect relevant data of factory equipment and production equipment through CPAs quickly and effectively, and the carbon footprint information is integrated into the intelligent energy management after performing the carbon footprint calculation through the intelligent carbon management, that is, the integration of intelligent carbon and energy management. The invention can assist enterprises to meet the premise of net zero while realizing the issues of intelligent manufacturing and energy management. Therefore, both energy saving and carbon reduction with green sustainability are taken into account.

Other embodiments of the aforementioned implementation manner are as follows: the enterprise organization information includes manufacturing execution system (MES) information, enterprise resource planning (ERP) information and factory basic demand information. The SCADA information includes wastewater system information, pure water system information, air-conditioning system information, air pollution system information, factory environment information and intelligent meter information, wherein the wastewater system information, the pure water system information, the air-conditioning system information and the air pollution system information belong to information of the factory equipment. The microgrid information includes battery status information, power information, green energy power generation information and cogeneration information. The environmental information includes indoor environmental factor information, carbon inventory boundary information, gas inventory information and outdoor environmental factor information. The production line information includes sensor information, and the production line information belongs to information of the production equipment.

Other embodiments of the aforementioned implementation manner are as follows: the cloud platform is configured to perform operations, further including: performing operations of factory equipment control and production equipment monitoring. Among them, the factory equipment control operation includes regulating and controlling the factory equipment in accordance with the optimized factory equipment parameters so that the factory equipment has minimum energy consumption under an optimum production environment condition. The production equipment monitoring operation includes performing the optimized production schedule and monitoring the production equipment so that the production equipment has minimum energy consumption.

Other embodiments of the aforementioned implementation manner are as follows: the cloud platform as mentioned above is configured to perform operations, further including: performing a microgrid power regulation operation. The microgrid power regulation operation includes performing the optimized energy distribution for the plurality of power generation equipment of the factory in accordance with the energy distribution ratio so that the plurality of power generation equipment has minimum carbon emission.

Other embodiments of the aforementioned implementation manner are as follows: the cloud platform is configured to perform operations, further including: performing a collaborative work judgment operation. The collaborative work judgment operation includes judging whether to participate in the collaborative work of a virtual power plant and generating a judgment result, and determining to perform one of the intelligent factory planning operation and the carbon neutrality operation in accordance with the judgment result.

Other embodiments of the aforementioned implementation manner are as follows: performing a power trading platform bidding operation by the cloud platform when the judgment result of the collaborative work judgment operation is yes; performing a carbon reduction confirmation operation by the cloud platform when the judgment result of the collaborative work judgment operation is no. The power trading platform bidding operation includes performing a bidding of a power trading platform in accordance with the judgment result. The carbon reduction confirmation operation includes confirming whether the microgrid power regulation operation meets a requirement of carbon reduction in accordance with the judgment result, if so, performing the carbon neutrality operation; otherwise, performing the intelligent factory planning operation again.

Other embodiments of the aforementioned implementation manner are as follows: the hybrid system of carbon and energy management for green intelligent manufacturing further includes a central dispatching platform which communicatively connected to the cloud platform, and the central dispatching platform configured to perform the bidding of the power trading platform. The collaborative work of the virtual power plant configures the cloud platform to receive an available upper limit instruction from the central dispatching platform. The bidding of the power trading platform configures the cloud platform to perform a distributed energy resource (DER) dispatch and a demand control in accordance with the available upper limit instruction so as to realize power trading.

Other embodiments of the aforementioned implementation manner are as follows: when the confirmation result of the net zero confirmation operation is no, the carbon neutrality operation is re-performed until the low-carbon energy allocation method complies with the net zero principle. When the confirmation result of the net zero confirmation operation is yes, the low-carbon energy allocation method complies with the net zero principle.

According to an embodiment of the method aspect of the present invention, a hybrid method of carbon and energy management for green intelligent manufacturing is provided, which includes an information collection step, an intelligent carbon management step, an intelligent energy management step and a net zero confirmation step. The information collection step includes configuring a plurality of cyber physical agents (CPAs) to collect a plurality of data sources. The plurality of data sources include enterprise organization information, supervisory control and data acquisition (SCADA) information, microgrid information, environmental information and production line information, wherein the SCADA information comes from factory equipment of a manufacturing device and the production line information comes from production equipment of the manufacturing device. The intelligent carbon management step includes a carbon disclosure step, a carbon reduction step and a carbon neutrality step. Among them, the carbon disclosure step includes configuring a cloud platform to perform carbon inventory on the manufacturing device and obtain an inventory data, then the inventory data is provided to the plurality of cyber physical agents, and product raw material information corresponding to a product is generated, wherein the inventory data includes a carbon emission.

The carbon reduction step includes configuring the cloud platform to improve a manufacturing process of the product in accordance with the product raw material information so as to reduce the carbon emission. The carbon reduction step includes configuring the cloud platform to improve a manufacturing process of the product in accordance with the product raw material information so as to reduce the carbon emission. The carbon neutrality step includes configuring the cloud platform to realize a net zero principle in accordance with a low-carbon energy allocation method when the carbon emission no longer be reduced through a product process planning at a present stage, wherein the low-carbon energy allocation method includes a carbon credit or a carbon offset. In addition, the intelligent energy management step includes an energy consumption prediction step, an intelligent factory planning step, and an intelligent microgrid integration step. The energy consumption prediction step includes configuring the cloud platform to predict an energy consumption of all equipment in a factory or the manufacturing device during a specific time period through the data sources. The intelligent factory planning step includes configuring the cloud platform to plan the product process planning with a minimum cost according to the energy consumption of the energy consumption prediction step and the carbon emission of the carbon reduction step, and optimized factory equipment parameters and an optimized production schedule are planned in accordance with the product process planning. The intelligent microgrid integration step includes configuring the cloud platform to formulate an optimized energy distribution for a plurality of power generation equipment of the factory in accordance with the product process planning so as to dynamically dispatch an energy distribution ratio of the plurality of power generation equipment within the specific time period. The net zero confirmation step includes configuring the cloud platform to confirm whether the product process planning and the low-carbon energy allocation method comply with the net zero principle and generate a confirmation result, then decide whether to re-preform the carbon neutral operation in accordance with the confirmation result so as to realize the net zero principle.

Therefore, the purpose of the invention is to provide a hybrid system and method of carbon and energy management for green intelligent manufacturing (GiM), which utilizes GiM hybrid architecture to quickly and effectively collect relevant data of the factory equipment and the production equipment through CPAs, and the carbon footprint information is integrated into the intelligent energy management after performing the carbon footprint calculation through the intelligent carbon management, that is, the integration of intelligent carbon management and intelligent energy management. The present invention can assist enterprises to meet the premise of net zero while realizing the issues of intelligent manufacturing and energy management, and take into account energy saving and carbon reduction with green sustainability.

Other embodiments of the aforementioned implementation manner are as follows: the enterprise organization information includes manufacturing execution system (MES) information, enterprise resource planning (ERP) information, and basic factory demand information. The SCADA information includes wastewater system information, pure water system information, air-conditioning system information, air pollution system information, factory environment information and intelligent meter information, among them, wastewater system information, pure water system information, air-conditioning system information and air pollution system information belong to information of factory equipment. The microgrid information includes battery status information, power information, green energy power generation information, and cogeneration information. The environmental information includes indoor environmental factor information, carbon inventory boundary information, gas inventory information and outdoor environmental factor information. The production line information includes sensor information, and the production line information belongs to information of the production equipment.

Other embodiments of the aforementioned implementation manner are as follows: the hybrid method of carbon and energy management for green intelligent manufacturing further includes a factory equipment control step and a step of monitoring production equipment. The factory equipment control step includes configuring the cloud platform to regulate and control the factory equipment in accordance with the optimized factory equipment parameters so that the factory equipment has minimum energy consumption under an optimum production environment condition. The production equipment monitoring step includes configuring the cloud platform to perform the optimized production schedule and monitor the production equipment so that the production equipment has minimum energy consumption.

Other embodiments of the aforementioned implementation manner are as follows: the hybrid method of carbon and energy management for green intelligent manufacturing further includes performing a microgrid power regulation step. The microgrid power regulation step includes configuring the cloud platform to perform the optimized energy distribution for the power generation equipment of the factory in accordance with the energy distribution ratio so that the power generation equipment has minimum carbon emission.

Other embodiments of the aforementioned implementation manner are as follows: the hybrid method of carbon and energy management for green intelligent manufacturing further comprising performing a collaborative work judgment step. The collaborative work judgment step configuring the cloud platform to judge whether to participate in the collaborative work of a virtual power plant and generate a judgment result, and determining to perform one of the intelligent factory planning step and the carbon neutrality step in accordance with the judgment result.

Other embodiments of the aforementioned implementation manner are as follows: performing a power trading platform bidding step by the cloud platform when the judgment result of the collaborative work judgment step is yes; and performing a carbon reduction confirmation step by the cloud platform when the judgment result of the collaborative work judgment step is no. The power trading platform bidding step includes configuring the cloud platform to perform a bidding of a power trading platform in accordance with the judgment result. The carbon reduction confirmation step includes configuring the cloud platform to confirm whether the microgrid power regulation step meets the requirement of carbon reduction in accordance with the judgment result, and if so, perform the carbon neutrality step; otherwise, perform the intelligent factory planning step again.

Other embodiments of the aforementioned implementation manner are as follows: the collaborative work of the virtual power plant configures the cloud platform to receive an available upper limit instruction from a central dispatching platform. The bidding of the power trading platform configures the cloud platform to perform a distributed energy resource (DER) dispatch and a demand control in accordance with the available upper limit instruction so as to realize power trading.

Other embodiments of the aforementioned implementation manner are as follows: when the confirmation result of the net zero confirmation step is no, the carbon neutrality step of the intelligent carbon management step is re-performed until the low-carbon energy allocation method complies with the net zero principle.

BRIEF DESCRIPTION OF THE DRAWINGS

In order to understand the embodiments and their advantages more completely, the following description is made with reference to the accompanying figures.

DETAILED DESCRIPTION

Figure 1:
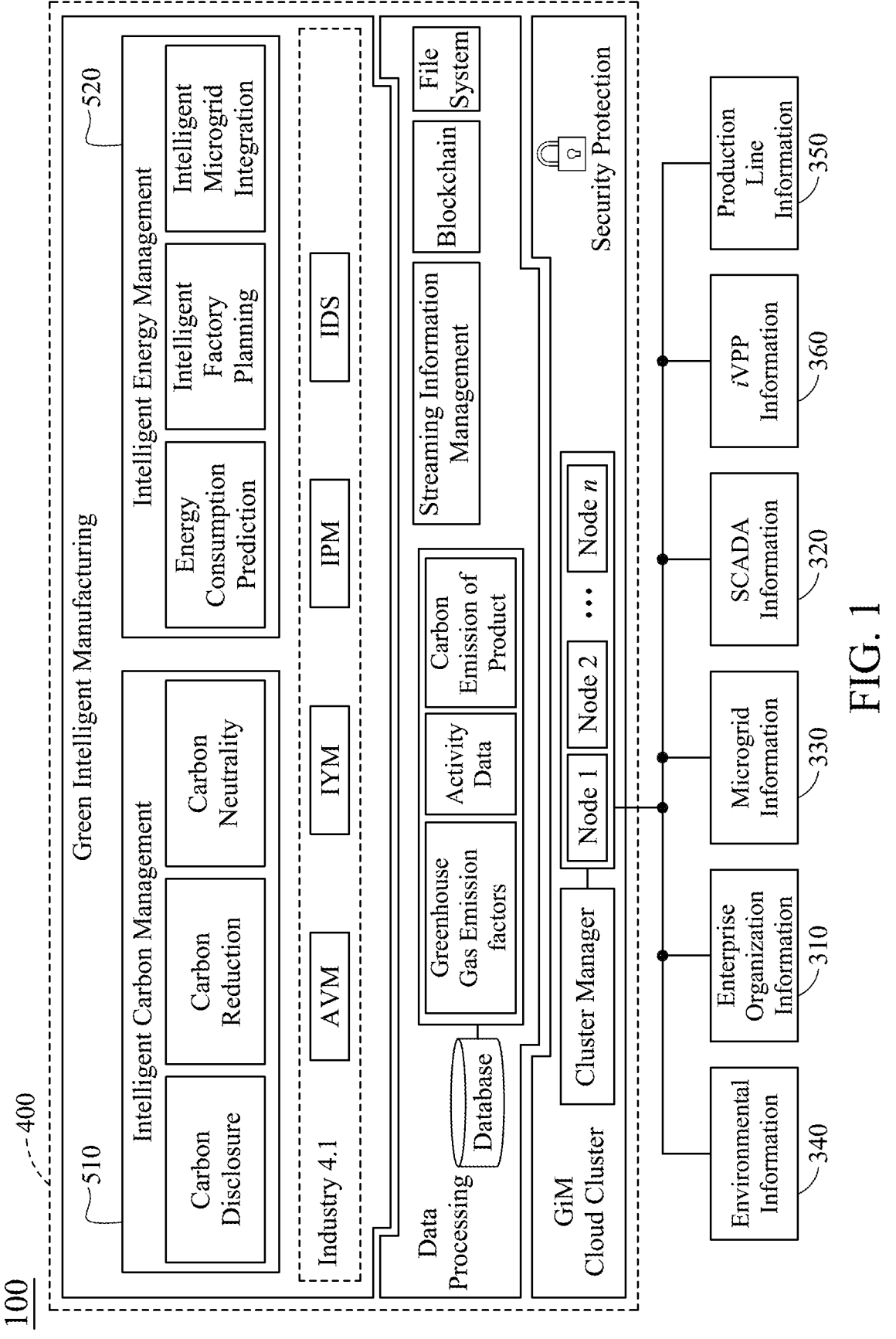
FIG. 1 is a diagram illustrating a hybrid system of carbon and energy management for green intelligent manufacturing according to a first embodiment of the present invention.

Some embodiments of the present invention will be described below with reference to the figures. For the sake of clarity, many practical details will be described together in the following description. It should be understood, however, that these practical details should not be used to limit the invention. That is, in some embodiments of the present invention, these practical details are unnecessary. In addition, for the purpose of simplifying the figures, some conventional structures and elements are shown in a simplified schematic manner in the figures; and repeated elements may be denoted by the same reference numerals.

In addition, when a certain element (or unit, module, etc.) is "connected" to another element herein, it may mean that the element is directly connected to another element, or it may also mean that a certain element is indirectly connected to another element, that is, there are other elements interposed between the element and another element. When it is expressly stated that an element is "directly connected" to another element, it means that no other element is interposed between the element and the other element. The terms first, second, third, etc. are only used to describe different elements, and do not limit the elements themselves. Therefore, the first element can also be renamed as the second element. The combination of elements/units/circuits herein is not commonly known, conventional or well-known in the field, and it cannot be determined whether the combination relationship can be easily completed by those with ordinary knowledge in the technical field based on whether the elements/units/circuits themselves are well-known.

The present invention proposes a hybrid system and method for green intelligent manufacturing (GiM), which combines the carbon reduction and the energy-saving into the smart-manufacturing based Industry 4.1 cloud platform. GiM assists companies to achieve the goal of net-zero transition and help them advance to Industry 4.2 as soon as possible by simultaneously taking carbon footprint and energy issues into account. GiM collects large volumes of essential data (including carbon footprint) via Cyber Physical Agents (CPAs), and sends them to two critical services of carbon management and intelligent Energy Management System (iEMS) deployed on the cloud platform. Carbon management includes three modules: carbon disclosure, carbon reduction, and carbon neutrality; while iEMS includes three AI-optimization modules of smart emission reduction, smart facility and smart microgrid integration. The two critical services optimize the energy dispatch schedule by strictly following the requirements of energy saving, carbon reduction, and net zero. Then, the state of zero defects of intelligent manufacturing achieved in Industry 4.1 can be upgraded to net zero of GiM in Industry 4.2. The hybrid method for GiM aims to balance energy conservation and carbon reduction with green sustainability, and further accelerate the process of achieving net zero carbon emissions.

Figure 2:
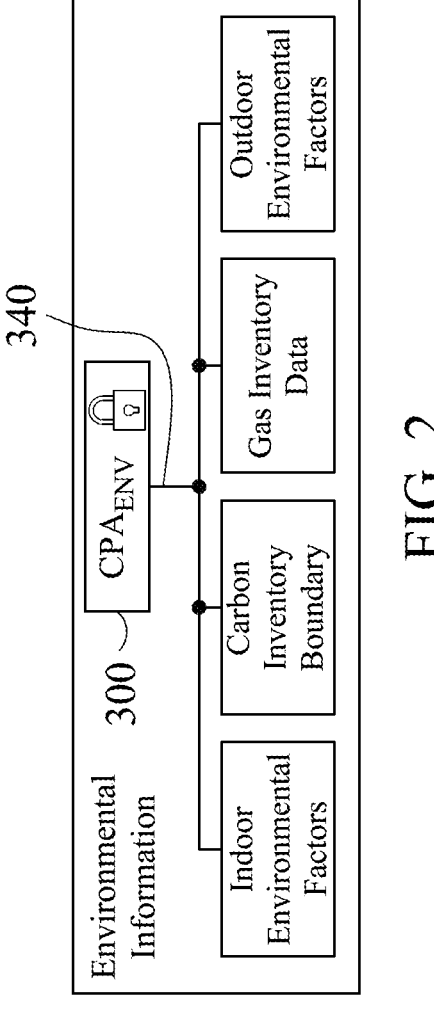
FIG. 2 is a diagram illustrating that the cyber physical agents collect the environmental information shown in FIG. 1.
Figure 3:
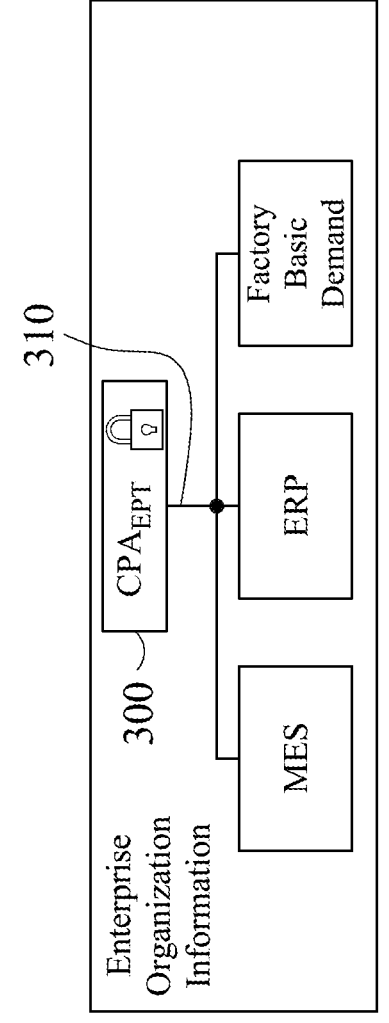
FIG. 3 is a diagram illustrating that the cyber physical agents collect the enterprise organization information shown in FIG. 1.
Figures 4, 5:
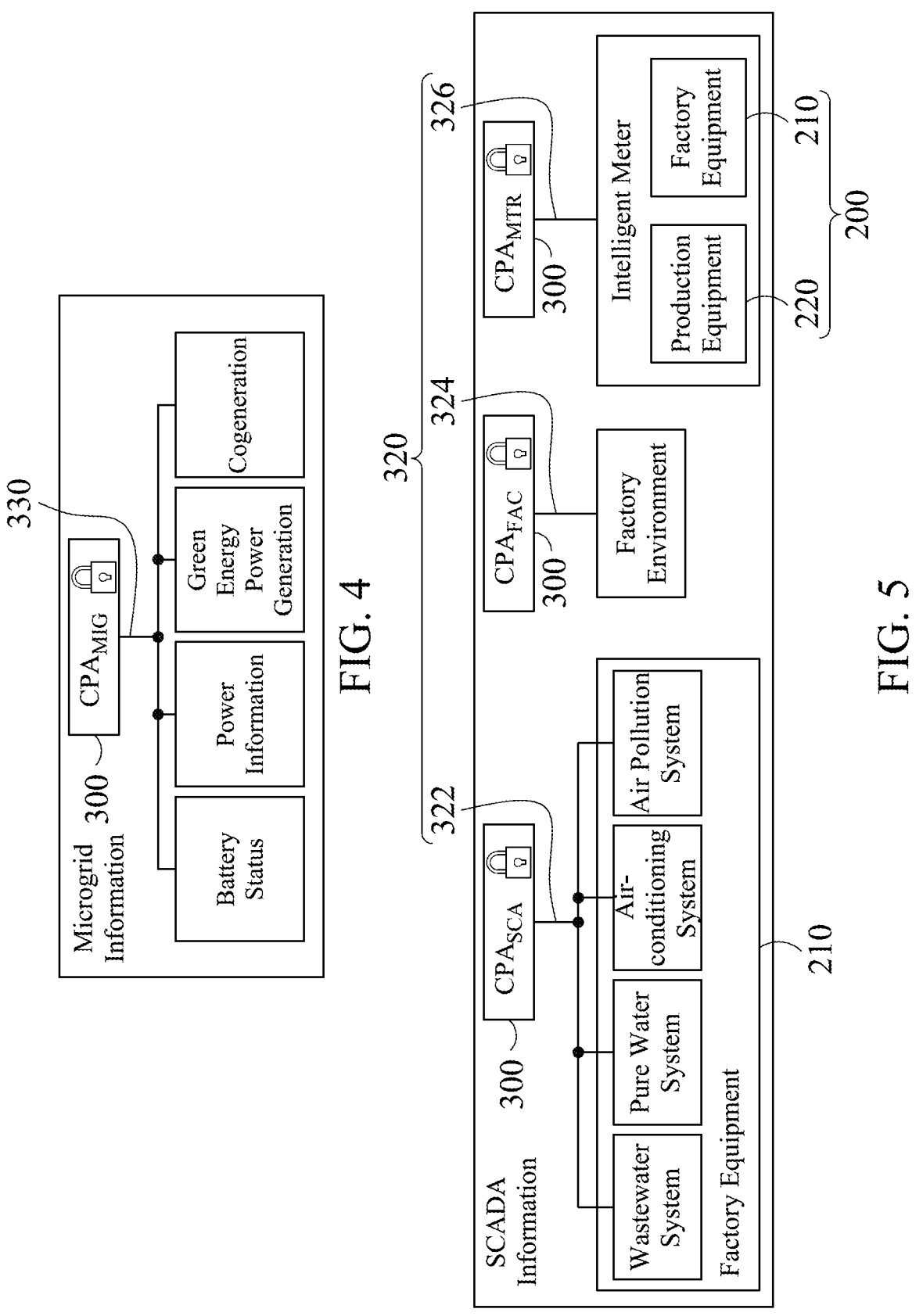
FIG. 4 is a diagram illustrating that the cyber physical agents collect the microgrid information shown in FIG. 1.
FIG. 5 is a diagram illustrating that the cyber physical agents collect the supervisory control and data acquisition information shown in FIG. 1.
Figures 6, 7:
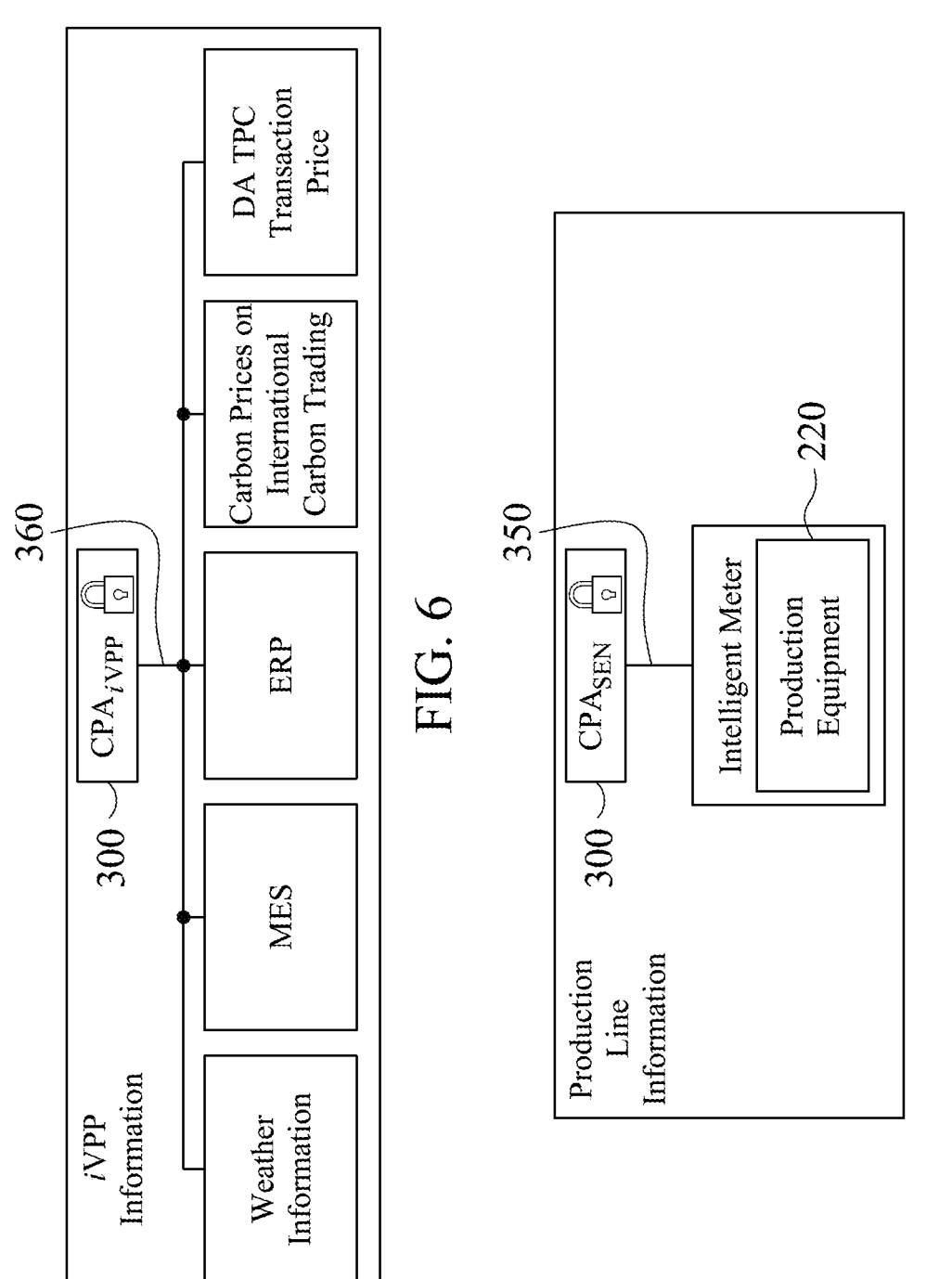
FIG. 6 is a diagram illustrating that the cyber physical agents collect the intelligent virtual power plant information shown in FIG. 1.
FIG. 7 is a diagram illustrating that the cyber physical agents collect the production line information shown in FIG. 1.

Referring to FIGS. 1-7, FIG. 1 is a diagram illustrating a hybrid system 100 of carbon and energy management for green intelligent manufacturing in accordance with the first embodiment of the present invention; FIG. 2 is a diagram illustrating that the cyber physical agents 300 ($CPA_{ENV}$) collects the environmental information 340 shown in FIG. 1; FIG. 3 is a diagram illustrating that cyber physical agents 300 ($CPA_{EPT}$) collects the enterprise organization information 310 shown in FIG. 1; FIG. 4 is a diagram illustrating that the cyber physical agents 300 ($CPA_{MIG}$) collects the microgrid information 330 shown in FIG. 1; FIG. 5 is a diagram illustrating that the cyber physical agents 300 ($CPA_{SCA}$, $CPA_{FAC}$, $CPA_{MTR}$) collect the supervisory control and data acquisition (SCADA) information 320 shown in FIG. 1; FIG. 6 is a diagram illustrating that the cyber physical agents 300 ($CPA_{iVPP}$) collect the intelligent virtual power plant (iVPP) information 360 shown in FIG. 1; and FIG. 7 is a diagram illustrating that the cyber physical agents 300 ($CPA_{SEN}$) collects the production line information 350 shown in FIG. 1. As shown in the figures, the hybrid system 100 of carbon and energy management for green intelligent manufacturing includes a manufacturing device 200, a plurality of cyber physical agents 300 and a cloud platform 400.

In order to meet the basic needs of Industry 4.2, the framework of green intelligent manufacturing (GiM) includes three technologies, and the three technologies are the cyber physical agents 300, intelligent carbon management and intelligent energy management (iEMS), respectively. The manufacturing device 200 includes factory equipment 210 and production equipment 220. The factory equipment 210 and the production equipment 220 are communicatively connected to the cloud platform 400 having GiM through the cyber physical agents 300, and various types of data sources are stored in the cloud platform 400 after data preprocessing.

The cyber physical agents (CPAs) 300 are communicatively connected to the manufacturing device 200. The cyber physical agents 300 belong to components of the Internet of things (IoT) and have security protection. In this embodiment, the cyber physical agents 300 include $CPA_{ENV}$, $CPA_{EPT}$, $CPA_{MIG}$, $CPA_{SCA}$, $CPA_{FAC}$, $CPA_{MTR}$, $CPA_{VPP}$, and $CPA_{SEN}$, but the invention is not limited thereto. Each of the cyber physical agents 300 includes: (1) utilizing vertical integration with the cloud service through communication module, sending information to the cloud server for storage or receiving instructions from the cloud service; (2) utilizing the equipment driver to integrate data with different sources, formats and processing methods horizontally, or transmit instructions to the device; (3) having pluggable application module, which can perform functions such as feature extraction and target data extraction; (4) having data collection plan, data collection will be performed whenever the status meets the conditions; (5) having kernel module to make each module operate smoothly and to coordinate the operation of each module in CPAs; (6) utilizing containerization technology to have advanced software functions of load balance, failover, health inspection and computing resource allocation; and (7) having general-purpose information security protection mechanism (SPM) framework planning, including digital signatures and hardware key identification, which can ensure that the data uploaded to the cloud manufacturing service are safe and untampered. In another embodiment, the cyber physical agents 300 mentioned above can refer to U.S. patent Ser. No. 10/618,137B2. That is, the embodiments of the present invention refer to the relevant provisions of the previous US patent (Incorporated by reference).

The cloud platform 400 is communicatively connected to the cyber physical agents 300 and is configured to perform the hybrid method 500 of carbon and energy management for green intelligent manufacturing. The cloud platform 400 includes the intelligent services of Industry 4.1 so that the original various types of prediction results can be obtained before the process of Industry 4.2 is achieved; the intelligent services of Industry 4.1 include automatic virtual metrology (AVM), intelligent predictive maintenance (IPM), intelligent yield management (IYM) and intelligent dispatching system (IDS). The cloud platform 400 also includes green intelligent manufacturing, intelligent carbon management and intelligent energy management of GiM. In one embodiment, the cloud platform 400 may include a cloud processor and a cloud memory (database). The cloud memory may include random access memory (RAM) or other types of dynamic storage devices that can store information and instructions for the cloud processor to perform. The information and instructions include greenhouse gas emission factors, activity data, product carbon emission, streaming information management, blockchain and file system. The cloud processor may include any type of processors, microprocessors, or field programmable gate arrays (FPGA) capable of compiling and performing instructions. The cloud processor may include a single device (e.g., single-core processor) or a group of devices (e.g., multiple-core processor).

Figure 8:
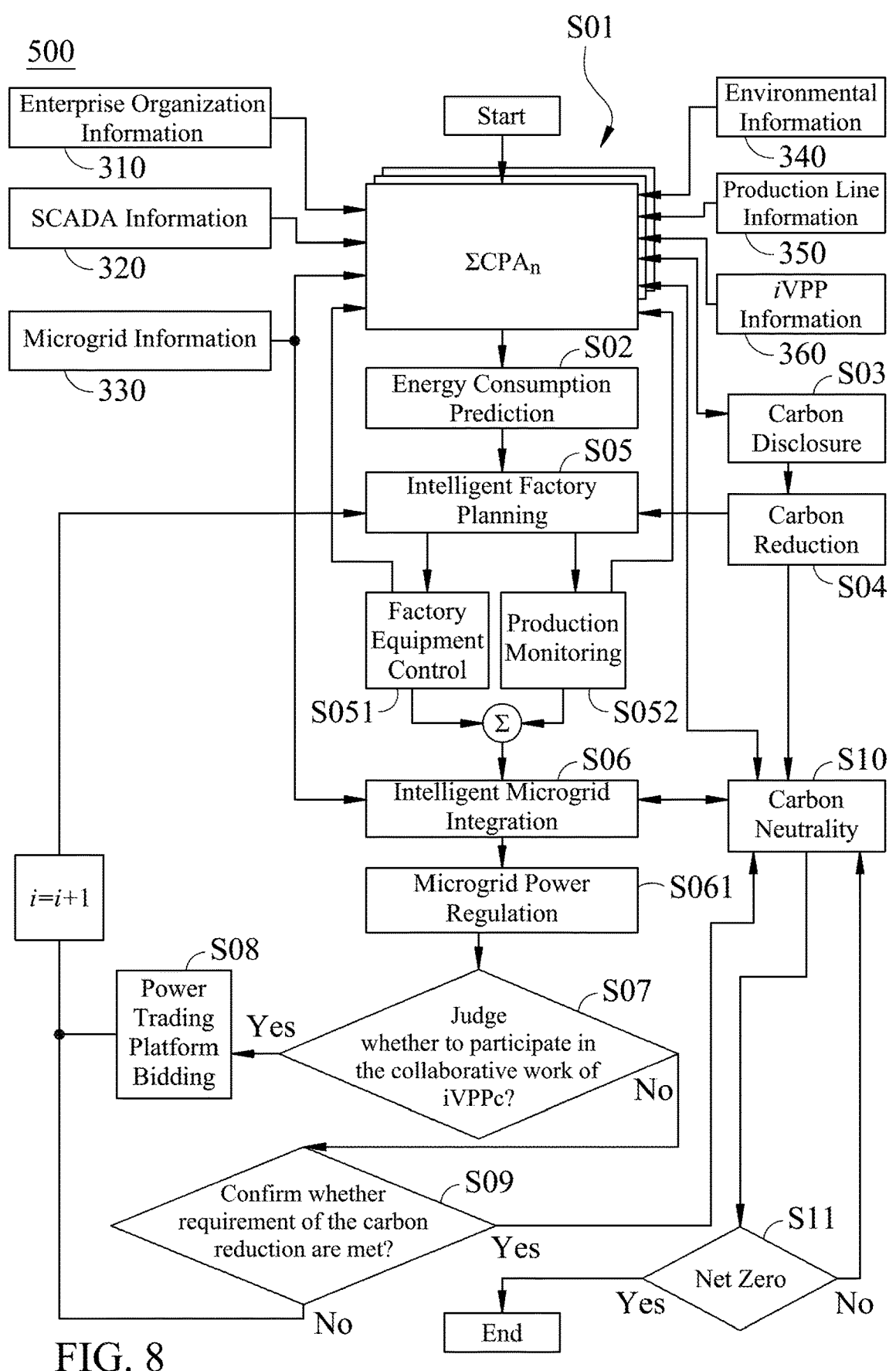
FIG. 8 is a flowchart diagram illustrating a hybrid method of carbon and energy management for green intelligent manufacturing according to a second embodiment of the present invention.

Referring to FIGS. 1-8. FIG. 8 is a flowchart diagram of a hybrid method 500 of carbon and energy management for green intelligent manufacturing in accordance with the second embodiment of the present invention. The hybrid method 500 of carbon and energy management for green intelligent manufacturing includes an information collection step S01, an intelligent carbon management step 510, an intelligent energy management step 520, a factory equipment control step S051, a production equipment monitoring step S052, a microgrid power regulation step S061, a collaborative work judgment step S07, a power trading platform bidding step S08, a carbon reduction confirmation step S09 and a net zero confirmation step S11. Among them, the intelligent carbon management step 510 includes a carbon disclosure step S03, a carbon reduction step S04 and a carbon neutrality step S10. The intelligent energy management step 520 includes an energy consumption prediction step S02, an intelligent factory planning step S05 and an intelligent microgrid integration step S06.

The information collection step S01 includes configuring the cyber physical agents 300 to collect a plurality of data sources, wherein the plurality of data sources include enterprise organization information 310, SCADA information 320, microgrid information 330, environmental information 340 and production line information 350. The SCADA information 320 comes from the factory equipment 210, and the production line information 350 comes from the production equipment 220. Specifically, the enterprise organization information 310 includes manufacturing execution system (MES) information, enterprise resource planning (ERP) information and factory basic demand information. The SCADA information 320 includes wastewater system information, pure water system information, air-conditioning system information, air pollution system information, factory environment information 324 and intelligent meter information 326. Among them, the wastewater system information, the pure water system information, the air-conditioning system information and the air pollution system information belong to the factory equipment information 322 of the factory equipment 210. The microgrid information 330 includes battery status information, power information, green energy power generation information and cogeneration information. The environmental information 340 includes indoor environmental factor information, carbon inventory boundary information, gas inventory information and outdoor environmental factor information. The production line information 350 includes sensor information, and the production line information 350 belongs to information of the production equipment 220. In addition, the data sources further include iVPP information 360 which includes an available upper limit instruction, weather information, ERP, MES and the day-ahead power auxiliary service of power market or the bidding results of demand response transaction (DA TPC transaction price).

The data sources of the cyber physical agents $CPA_{ENV}$ that collects the environmental information 340 are shown in Table 1; the data sources of the cyber physical agents $CPA_{EPT}$ that collects enterprise organization information 310 are shown in Table 2; the data sources of the cyber physical agents $DPA_{MIG}$ that collects microgrid information 330 are shown in Table 3; the data sources of the cyber physical agents (including $CPA_{SCA}$, $CPA_{FAC}$, $CPA_{MTR}$) that collect SCADA information 320 are shown in Table 4; the data sources of the cyber physical agents $CPA_{iVPP}$ that collect iVPP information 360 are shown in Table 5; the data sources of the cyber physical agents $CPA_{SEN}$ that collect the production line information 350 are shown in Table 6. Tables 1 to 6 correspond to various CPAs settings differentiated by data sources in a single production line environment. The frequency of data collection can be known from the data collection plan in Tables 1 to 6.

TABLE 1

| Collection items | Data sources | Data processing | Data collection plan | Data usage |
|---|---|---|---|---|
| Carbon inventory boundary | Defined by management level personnel of enterprises (or organizations), including organizational boundary and reporting boundary Collected by using human machine interface (web page) | None | Determined by the enterprises/organizations | Intelligent carbon management |
| Carbon emission factor | Public documents of the Business greenhouse gas emissions information platform: (1)The management form of greenhouse gas emission factors; (2) The inventory form of the greenhouse gas | Extract specific content from a file | Once a day | Intelligent carbon management |
| Gas inventory data | Obtain the results of carbon inventory completed by the factory staff. Collected by using the information platform of the human-machine interface | None | Once a day | Intelligent carbon management |
| Outdoor environmental factors | Download data of the stations of the Central Meteorological Bureau of the Ministry of Communications | Get the latest measurement of temperature | Every 1 hour | Intelligent energy management |
| Indoor environmental factors | Thermohygrometer | Calculate average value | Every 15 minutes | Intelligent energy management |

TABLE 2

| Collection items | Data sources | Data processing | Data collection plan | Data usage |
|---|---|---|---|---|
| Factory basic demand | The operating conditions of the equipment provided by the management personnel are collected using the human-machine interface platform. | None | Once a day | Intelligent energy management |
| The items of data collected are as follows: raw material cost (supply chain management) | ERP database (obtained through API, such as ODBC) | Use SQL syntax to get the required data | Every 15 minutes | Intelligent carbon management |

TABLE 2-continued

| Collection items | Data sources | Data processing | Data collection plan | Data usage |
|---|---|---|---|---|
| bill of materials (BOM) | | | | |
| The items of data collected are as follows: work in process, capacity and tools | MES database (obtained through API, such as ODBC) | Use SQL syntax to get the required data | Every 15 minutes | Intelligent energy management |

TABLE 3

| Collection items | Data sources | Data processing | Data collection plan | Data usage |
|---|---|---|---|---|
| Power information | Download public information of the power company, including outage information for planned work and tariff. | Filter to obtain regional data | Once a day | Intelligent energy management |
| Battery status | Database of battery management system (obtained through API, such as ODBC) | Use SQL syntax to get the required data | Every 15 minutes | Intelligent energy management |
| Green energy power generation Cogeneration | Database of energy management system (obtained through API, such as ODBC) | Use SQL syntax to get the required data | Every 15 minutes | Intelligent energy management |

TABLE 4

| Collection items | Data sources | Data processing | Data collection plan | Data usage |
|---|---|---|---|---|
| Factory equipment, Production equipment | Database linked to SCADA | Use SQL syntax to get the required data(such as intelligent meter data) | Every 15 minutes | Intelligent energy management |
| Factory environment information | Collect sensor data, such as: thermohygrometer | Calculate the average value | Every 15 minutes | Intelligent energy management |

TABLE 5

| Collection items | Data sources | Data processing | Data collection plan | Data usage |
|---|---|---|---|---|
| Transaction prices in the day-ahead ancillary services | Power trading platform of power company | Use Web Crawler to filter and obtain price data | Once a day | Virtual power plant |

TABLE 5-continued

| Collection items | Data sources | Data processing | Data collection plan | Data usage |
|---|---|---|---|---|
| market of power company | | | | |
| Carbon prices on international carbon trading platforms | Integrate carbon prices from various international carbon trading platforms | Calculate average value of carbon prices | Once a day | Virtual power plant |

TABLE 6

| Collection items | Data sources | Data processing | Data collection plan | Data usage |
| --- | --- | --- | --- | --- |
| performing status | Controllers for factory or production equipment Linking using OPC UA | None (integrated with sensor data) | Maximum data update frequency allowed by the device | Intelligent energy management |
| Sensing data | Collect sensor data | Calculate feature value of parameters | Collection is performed at 2000 Hz currently | Intelligent energy management |

The energy consumption prediction step S02 includes configuring the cloud platform 400 to predict an energy consumption of all equipment in a factory or the manufacturing device 200 during a specific time period through the data sources. Specifically, the energy consumption prediction step S02 collects the environmental information ($x_{env}$), the factory equipment information ($x_{fac}$) and the production equipment information ($x_{pro}$) through CPAs, using the long short-term memory (LSTM) neural network in the recurrent neural network to predict the predicted value ELE of the energy consumption of the whole plant. After the prediction is completed, it will be output to the intelligent factory planning step S05 as a reference for the factory and production configuration. The predicted value ELE of energy consumption can be expressed by equation (1):

$$ELE = x_{env} + x_{fac} + x_{pro} + Error_{ele} \qquad (1);$$

among them, $x_{env}$ represents the environmental information, $x_{fac}$ represents the factory equipment information, $x_{pro}$ represents the production equipment information, and $Error_{ele}$ represents the error of ELE prediction value.

The carbon disclosure step S03 includes configuring the cloud platform 400 to perform carbon inventory on the manufacturing device 200 and obtain an inventory data, then providing the inventory data to the cyber physical agents 300 to generate product raw material information corresponding to a product. The inventory data includes carbon emission.

The carbon reduction step S04 includes configuring the cloud platform 400 to improve the manufacturing process of the product in accordance with the product raw material information so as to reduce carbon emissions. Specifically, the carbon reduction step S04 of the intelligent carbon management step 510 reduces the carbon emissions of the product in the planning or process stage (i.e., the manufacturing process) in accordance with the product raw material information and the carbon inventory result. Minimum carbon emissions and product production costs may be solved by mixed integer linear programming of the intelligent dispatching system (IDS) of Industry 4.1. The objective formula of the minimum carbon reduction (min F) can be expressed by equation (2):

$$\min F = IDS(w \times \Sigma_{p,m} CE_{pm} + (1-w) \times \Sigma_{p,m} COST_{pm}) \qquad (2);$$

among them, IDS represents the optimization solver of the intelligent dispatching system, and w represents the priority weight. p represents the product, p=1, . . . , P. m represents the machine, m=1, . . . , M. P and M are positive integers. $CE_{pm}$ represents the carbon emission of product p of machine m, and $COST_{pm}$ represents the production cost of product p of machine m. Furthermore, the optimized product or process planning after considering carbon reduction will be updated to the intelligent factory planning step S05 at the same time so as to update the optimal configuration of the factory equipment 210 and the production equipment 220. Mixed integer linear programming is an embodiment of integer programming.

The intelligent factory planning step S05 includes configuring the cloud platform 400 to plan the product process planning with a minimum cost according to the energy consumption of the energy consumption prediction step S02 and the carbon emission of the carbon reduction step S04, and optimized factory equipment parameters and an optimized production schedule are planned in accordance with the product process planning. In detail, the factory equipment 210 and the production equipment 220 are monitored under the intelligent factory planning step S05 based on the premise of minimizing the total cost (C), the parameters of the factory equipment 210 can be adjusted under the optimum production conditions, therefore, the energy consumption and carbon emissions used by the factory side are the lowest. After the adjustment is completed, the production and environmental costs are measured to evaluate benefits of energy saving. The present invention solves the four costs (i.e., delivery delay cost ($C_{wait}$), production cost ($C_{pro}$), power cost ($C_{ele}$) and carbon emission cost ($C_{ce}$)) included in the total cost (C) through the MILP method of the IDS of Industry 4.1, and obtains the configuration of minimum energy consumption and carbon emission of the production side and the factory side. The minimum total cost (min C) can be expressed by equation (3):

$$\min C = IDS(C_{wait} + IPM(C_{pro}) + C_{ele} + C_{ce}) \qquad (3);$$

among them, IDS represents the optimization solver of the intelligent dispatching system, $C_{wait}$ represents the cost of delivery delay, IPM represents the function of intelligent predictive maintenance, $C_{Pro}$ represents the cost of production, $C_{ele}$ represents the cost of power, and $C_{Ce}$ represents the cost of carbon emission. In addition, the condition of the production machine is also a part of $C_{pro}$. The condition of the production machine (such as the tool wear level and the remaining life of the machine) can be quantified through the IPM module of Industry 4.1 and regarded as a part of the cost of production. $C_{ele}$ is calculated from the configuration energy consumption and the period power price output from the intelligent factory planning step S05. The ELE predicted in the energy consumption prediction step S02 represents the basic energy consumption of the factory area within a specific time period. Therefore, the energy consumption for the configuration of the factory equipment 210 and the production equipment 220 in the intelligent factory is less than the ELE predicted value.

The estimation of carbon emission (CE) can be obtained by inputting the factory equipment information ($x_{fac}$) and the production equipment information ($x_{pro}$) to the carbon disclosure step S03. The relationship between CE and $x_{fac}$, $x_{pro}$ can be expressed by equation (4):

$$CE=CD(x_{fac},x_{pro}) \qquad (4);$$

among them, CE represents the carbon emission, CD represents the carbon disclosure function of the intelligent carbon management, $x_{fac}$ represents the factory equipment information, and $x_{pro}$ represents the production equipment information.

The factory equipment control step S051 includes configuring the cloud platform 400 to regulate and control the factory equipment in accordance with the optimized factory equipment parameters so that the factory equipment 210 has minimum energy consumption under an optimum production environment condition. Among them, the optimum production environment conditions can be formulated by the enterprise organization. The definition of the optimum production environment condition is that the corresponding factory parameter settings of the factory equipment are established by the enterprise based on the actual outdoor temperature (such as 28 degrees Celsius), indoor temperature (such as 20 degrees Celsius) or the specific environmental conditions of the product during production or measurement (such as constant temperature 25-27 degrees Celsius, relative humidity 65-75%, illuminance 750-300 lux, air pressure 7.2-8.0 kg/cm²), for example, the temperature of return pipe machine is 10.5 degrees Celsius and the temperature of supply pipe is 8.5 degrees Celsius of the chilled water; the target pressure, exhaust pressure and automatic shutdown pressure of the compressed air system are 7.5 kg/cm², 7.8 kg/cm² and 8.0 kg/cm², respectively; the air duct temperature, air duct humidity, air duct pressure and dew point temperature of the air-conditioning system are 15 degrees Celsius, 95%, 10 Pa and 12.5 degrees Celsius, respectively.

The production equipment monitoring step S052 includes configuring the cloud platform 400 to perform an optimized production schedule, monitoring the production equipment 220 so that the production equipment 220 has minimum energy consumption.

The intelligent microgrid integration step S06 includes configuring the cloud platform 400 to formulate an optimal energy distribution for a plurality of power generation equipment in the factory in accordance with the product process planning so as to dynamically dispatch an energy distribution ratio of the power generation equipment in the factory within a specific time period. In detail, the intelligent microgrid integration step S06 may obtain the optimal energy distribution ratio among green energy (GE), battery energy storage system (BESS) and purchased power according to the environmental information (e.g., ambient temperature and humidity meter data), energy consumption in the energy consumption prediction step S02, product process planning in the intelligent factory planning step S05, optimized factory equipment parameters and optimized production schedule, which can be defined by equation (5):

$$\text{Energy distribution}=IDS(\alpha_1 \times GE + \alpha_2 \times IPM(BESS) + (1-\alpha_1-\alpha_2) \times P) \qquad (5);$$

among them, GE represents the best green energy, BESS represents the energy storage system, P represents the purchased power, and $\alpha_1$, $\alpha_2$, $(1-\alpha_1-\alpha_2)$ represent the distribution ratio of each energy. Among them, the energy storage system is an important source of power in the plant, and its battery status and aging degree may affect the results of power distribution. Therefore, the intelligent microgrid integration step S06 needs to use the IPM of Industry 4.1 to quantify state of health (SoH) and state of charge (SoC) of the battery as reference variables for energy distribution, and then solve the optimization problem of power distribution through the IDS of Industry 4.1. The power (green energy) generated by the renewable energy output in the intelligent microgrid integration step S06 can be used to offset the power of the carbon neutrality, thereby achieving net zero. In one embodiment, the optimization can be achieved using a multi-objective genetic algorithm. For details of the multi-objective genetic algorithm can be found in the paper by D. Lee, Y. Chen and S. Chao ("Universal workflow of artificial intelligence for energy saving", Energy Reports, vol. 8, pp. 1602-1633, November 2022), and the paper by S. Zhou, X. Li, N. Du, Y. Pang and H. Chen ("A multi-objective differential evolution algorithm for parallel batch processing machine scheduling considering electricity consumption cost", Computers & Operations Research, vol. 96, pp. 55-68, August 2018), the embodiments of the present invention refer to the papers of D. Lee, Y. Chen and S. Chao and the relevant provisions of the papers of S. Zhou, X. Li, N. Du, Y. Pang and H. Chen (Incorporated by reference).

The microgrid power regulation step S061 includes configuring the cloud platform 400 to perform the optimal energy distribution for the power generation equipment of the factory accordance with the energy distribution ratio, so that the power generation equipment has minimum carbon emission. The microgrid power regulation step S061 can realize the benefits of peak shaving, peak shifting and load shifting.

The collaborative work judgment step S07 includes configuring the cloud platform 400 to judge whether to participate in the collaborative work of a virtual power plant and generate a judgment result, and determining to perform one of intelligent factory planning step S05 of the intelligent energy management step 520 and the carbon neutrality step S10 of the intelligent carbon management step 510 in accordance with the judgment result. The collaborative work of the virtual power plant configures the cloud platform 400 to receive an available upper limit instruction from a central dispatching platform.

When the judgment result of the collaborative work judgment step S07 is yes, the cloud platform 400 performs a power trading platform bidding step S08. The power trading platform bidding step S08 includes configuring the cloud platform 400 to perform a bidding of a power trading platform in accordance with the judgment result, and to re-preform the intelligent factory planning step S05. The number of times of preforming the intelligent factory planning step S05 may be counted through the parameter i.

When the judgment result of the collaborative work judgment step S07 is no, a carbon reduction confirmation step S09 is performed by the cloud platform 400. The carbon reduction confirmation step S09 includes configuring the cloud platform 400 to confirm whether the microgrid power regulation step S061 meets the carbon reduction requirement in accordance with the judgment result, and if so, the carbon neutrality step S10 is performed, otherwise, the intelligent factory planning step S05 is performed again.

The carbon neutrality step S10 includes configuring the cloud platform 400 to realize a net zero principle according to a low-carbon energy allocation method when the carbon emission no longer be reduced through a product process planning at present stage, wherein the low-carbon energy allocation method includes a carbon credit or a carbon offset. The carbon credit represents the purchase of carbon credit.

The net zero confirmation step S11 includes configuring the cloud platform 400 to confirm whether the low-carbon energy allocation method in the product process planning and carbon neutrality step S10 complies with the net zero principle, generating a confirmation result. Then, deciding whether to re-perform the carbon neutrality step S10 of the intelligent carbon management step 510 in accordance with the confirmation result, thereby realizing the net zero principle. When the confirmation result of the net zero confirmation step S11 is no, the carbon neutrality step S10 of the intelligent carbon management step 510 is re-performed by the cloud platform 400 until the low-carbon energy allocation method complies with the net zero principle; when the confirmation result of the net zero confirmation step S11 is yes, the low-carbon energy allocation method complies with the net zero principle, and the cloud platform 400 ends the confirmation.

In this way, the hybrid system 100 of carbon and energy management for green intelligent manufacturing and the hybrid method 500 of carbon and energy management for green intelligent manufacturing of the present invention utilizes GiM hybrid architecture to collect relevant data of factory equipment 210 and production equipment 220 through CPAs quickly and effectively, and the carbon footprint information is integrated into the intelligent energy management after performing the carbon footprint calculation through the intelligent carbon management, that is, the integration of intelligent carbon and energy management. The present invention can assist enterprises to meet the premise of net zero while realizing the issues of intelligent manufacturing and energy management, and take into account energy saving and carbon reduction with green sustainability.

Figure 9:
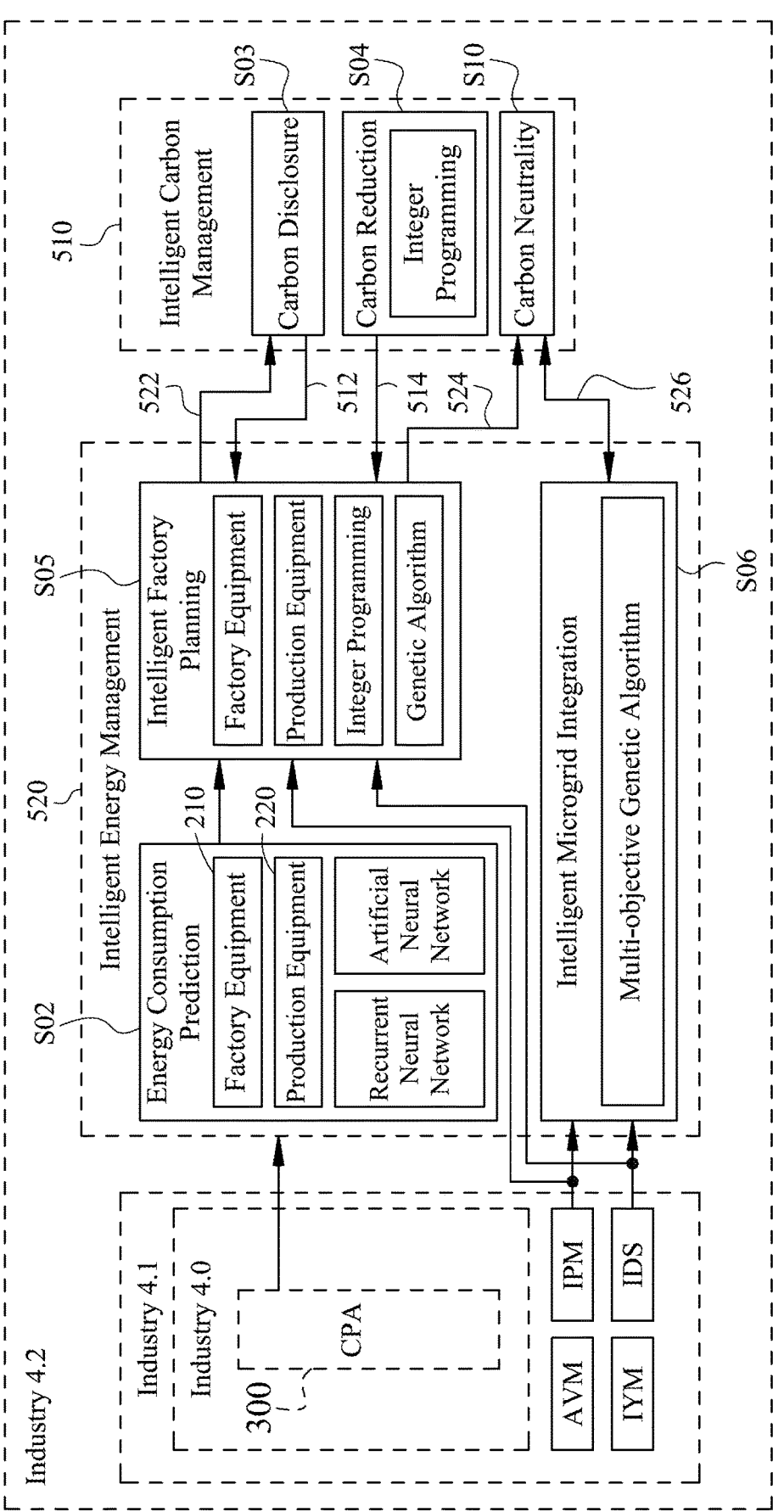
FIG. 9 is a diagram illustrating communication interface parameters of the green intelligent manufacturing based on Industry 4.2 of the present invention.

Referring to FIGS. 1-9, wherein FIG. 9 is a diagram illustrating communication interface parameters of the green intelligent manufacturing based on Industry 4.2 of the present invention. As shown in the figure, the iEMS and the intelligent carbon management of GiM can be integrated through the communication interface parameters. The biggest difference between the iEMS of the present invention and the conventional EMS is that the iEMS incorporates carbon footprint information to achieve the goal of net zero. Therefore, it is necessary to communicate and transfer parameters between the iEMS and the intelligent carbon management. As may be seen from FIG. 9, the three operations (i.e., the carbon disclosure step S03, the carbon reduction step S04, and the carbon neutrality step S10) in the intelligent carbon management step 510 are responsible for the transmission parameters related to the iEMS include: (1) factory information 522: is provided to the carbon disclosure step S03 by the intelligent factory planning step S05, which includes the time interval for power-on and power-off of the factory equipment 210 and the available power of the production equipment 220 (the upper limit of the contracted power consumption minus the factory power consumption); (2) carbon emissions 512: is provided to the intelligent factory planning step S05 by the carbon disclosure step S03, which includes the carbon emissions of the factory equipment 210 and the production equipment 220 and the carbon emissions of the product; (3) product process planning 514: is provided to the intelligent factory planning step S05 by the carbon reduction step S04, which includes an optimized product process planning considering carbon reduction; (4) carbon footprint 524: is provided to the carbon neutrality step S10 by the intelligent factory planning step S05 (actually power consumption×carbon factor); (5) green energy 526: is a bidirectional arrow and is provided to the carbon neutrality step S10 by the intelligent microgrid integration step S06 first, which includes the power generated by the renewable energy (used to offset the power generated in the carbon neutrality step S10). Next, provided to the intelligent microgrid integration step S06 by the carbon neutrality step S10, which includes the amount of carbon offset by the carbon neutrality step S10. In this way, GiM and the intelligent carbon management of the iEMS may achieve the goal of net zero through the integration of communication interface parameters in present invention.

Figure 10:
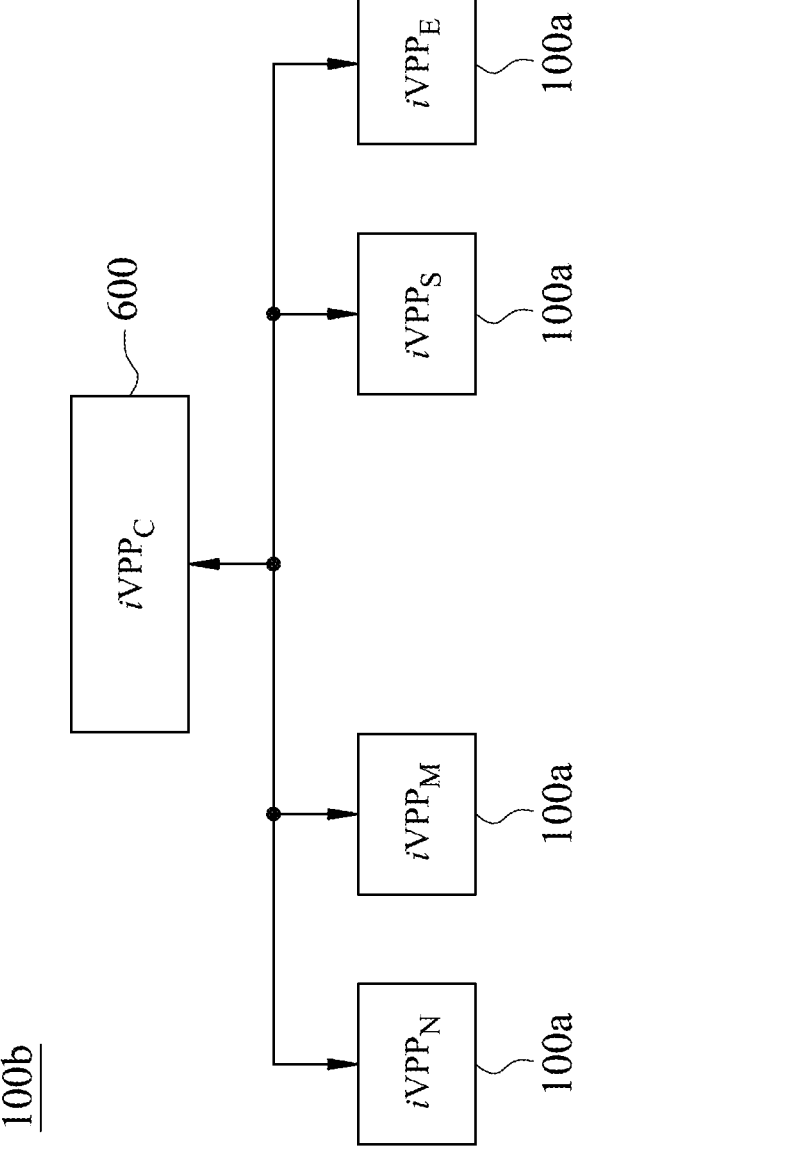
FIG. 10 is a diagram illustrating an architecture of a virtual power plant based on green intelligent manufacturing according to a third embodiment of the present invention.

Referring to FIGS. 1-10, wherein FIG. 10 is a diagram illustrating an architecture of a virtual power plant (iVPP) based on green intelligent manufacturing according to a third embodiment of the present invention. The architecture of the virtual power plant based on green intelligent manufacturing may be applied to the hybrid system 100b of carbon and energy management for green intelligent manufacturing of the present invention, which includes a plurality of regional systems 100a (iVPP$_N$, iVPP$_M$, iVPP$_S$, iVPP$_E$) and a central dispatcher platform 600 (iVPP$_C$). Each of regional systems 100a corresponds to the hybrid system 100 of carbon and energy management of green intelligent manufacturing in FIG. 1; in other words, each regional system 100a includes a manufacturing device 200, a plurality of cyber physical agents 300 and a cloud platform 400, and details thereof will not be repeated. The central dispatching platform 600 is communicatively connected to the cloud platform 400, and is used for performing the bidding of the power trading platform. The cloud platform 400 is configured to receive an available upper limit instruction from the central dispatching platform 600. The bidding of the power trading platform configures the cloud platform to perform a distributed energy resource (DER) dispatch and a demand control in accordance with the available upper limit instruction, thereby realizing power trading.

It can be understood that the hybrid method 500 of carbon and energy management for green intelligent manufacturing of the present invention is the above-mentioned implementation steps, and the computer program product of the present invention is used to perform the hybrid method 500 of carbon and energy management for green intelligent manufacturing. The order of each implementation step described in the above embodiments can be adjusted, combined or omitted as needed. The embodiments as mentioned above may be implemented using a computer program product, which may include a machine-readable medium storing a plurality of instructions for programming a computer to perform the steps of the embodiments. The machine-readable medium may be, but is not limited to, floppy disks, CD-ROMs, CD-ROMs, magneto-optical disks, read-only memory, random access memory, erasable programmable read-only memory (EPROM), electronically erasable programmable read-only memory (EEPROM), optical cards or magnetic cards, flash memory, or any machine-readable medium suitable for storing electronic instructions. Furthermore, the embodiments of the present invention can also be downloaded as a computer program product, which can transfer the computer program product of the present invention from a remote computer to a requesting computer by using a data signal of a communication connection (e.g., a connection such as a network connection).

It is also noted that the present invention can also be described in the context of a manufacturing system. Although the present invention can be implemented in semiconductor fabrication, the present invention is not limited to semiconductor fabrication and can also be applied to other manufacturing industries. Manufacturing systems are configured to manufacture workpieces or products including, but not limited to, microprocessors, memory devices, digital signal processors, application-specific circuits (ASICs), or other similar devices. In addition to application of semiconductor devices, the present invention can also be applied to other workpieces or products, such as vehicle wheel frames, screws, and papermaking. The manufacturing systems include one or more processing tools that can be used to form one or more products or portions of products on or in workpieces (e.g., wafers, glass substrates, paper), those skilled in the art may understand that the processing tools can be any number and any type, including lithography machines, deposition machines, etching machines, grinding machines, annealing machines, machine tools and similar tools. In embodiments, the manufacturing systems also include scatterometers, ellipsometers, scanning electron microscopes, and similar instruments.

As can be seen from the above-mentioned embodiments, the present invention has the following advantages: First, GiM hybrid architecture is used to collect relevant data of factory equipment and production equipment through CPAs quickly and effectively, and the carbon footprint information is integrated into the intelligent energy management after performing the carbon footprint calculation through the intelligent carbon management, that is, the integration of intelligent carbon management and intelligent energy management. The present invention can assist enterprises to meet the premise of net zero while realizing the issues of intelligent manufacturing and energy management, and take into account energy saving and carbon reduction with green sustainability. Second, the iEMS and the intelligent carbon management of GiM in the present invention are integrated through the communication interface parameters, which can achieve the goal of net zero. Third, the microgrid power regulation steps can realize the benefits of peak shaving, peak shifting and load shifting. Fourth, the bidding of the power trading platform is used to perform DER dispatching and demand control can realize power trading.

Although the present invention has been disclosed above in the embodiments, it is not intended to limit the present invention. Anyone skilled in the art may make various changes and modifications without departing from the spirit and scope of the present invention. Therefore, the protection scope of the present invention should be determined by the scope of the appended patent application.

What is claimed is:

1. A hybrid system of carbon and energy management for green intelligent manufacturing, comprising:
   a manufacturing device comprising factory equipment and production equipment;
   a plurality of cyber physical agents (CPAs) communicatively connected to the manufacturing device and configured to collect a plurality of data sources, wherein the plurality of data sources comprise enterprise organization information, supervisory control and data acquisition (SCADA) information, microgrid information, environmental information and production line information, the SCADA information comes from the factory equipment, and the production line information comes from the production equipment; and
   a cloud platform communicatively connected to the plurality of cyber physical agents and configured to perform operations comprising:
      performing a carbon disclosure operation, the carbon disclosure operation comprising obtaining an inventory data by performing carbon inventory on the manufacturing device, and then providing the inventory data to the plurality of cyber physical agents, and generating product raw material information corresponding to a product, and the inventory data comprising a carbon emission;
      performing a carbon reduction operation, the carbon reduction operation comprising improving a manufacturing process of the product based on the product raw material information so as to reduce the carbon emission;
      performing a carbon neutrality operation, the carbon neutrality operation comprising realizing a net zero principle according to a low-carbon energy allocation method when the carbon emission is not reduced through a product process planning at a present stage, wherein the low-carbon energy allocation method comprises a carbon credit or a carbon offset;
      performing an energy consumption prediction operation, the energy consumption prediction operation comprising predicting an energy consumption of all equipment in a factory or the manufacturing device during a specific time period according to the data sources;
      performing an intelligent factory planning operation, the intelligent factory planning operation comprising planning the product process planning with a minimum cost according to the energy consumption predicted by the energy consumption prediction operation and the carbon emission of the carbon reduction operation, and optimized factory equipment parameters and an optimized production schedule planned in accordance with the product process planning;
      performing an intelligent microgrid integration operation, the intelligent microgrid integration operation comprising formulating an optimized energy distribution for a plurality of power generation equipment of the factory in accordance with the product process planning so as to dynamically dispatch an energy distribution ratio of the plurality of power generation equipment within the specific time period; and
      performing an net zero confirmation operation, the net zero confirmation operation comprising confirming whether the product process planning and the low-carbon energy allocation method comply with the net zero principle and generating a confirmation result, and then deciding whether to re-perform the carbon neutrality operation in accordance with the confirmation result so as to realize the net zero principle;
   wherein the cloud platform is configured to perform the operations, further comprising:
   performing a collaborative work judgment operation, the collaborative work judgment operation comprising judging whether to participate in the collaborative work of a virtual power plant and generating a judgment result, and determining to perform one of the intelligent factory planning operation and the carbon neutrality operation in accordance with the judgment result.

2. The hybrid system of carbon and energy management for green intelligent manufacturing of claim 1, wherein the enterprise organization information comprises manufacturing execution system (MES) information, enterprise resource planning (ERP) information and factory basic demand information;
   the SCADA information comprises wastewater system information, pure water system information, air-conditioning system information, air pollution system information, factory environment information and intelligent meter information, wherein the wastewater system information, the pure water system information, the air-conditioning system information and the air pollution system information belong to information of the factory equipment;

the microgrid information comprises battery status information, power information, green energy power generation information and cogeneration information;

the environmental information comprises indoor environmental factor information, carbon inventory boundary information, gas inventory information and outdoor environmental factor information; and the production line information comprises sensor information, and the production line information belongs to information of the production equipment.

3. The hybrid system of carbon and energy management for green intelligent manufacturing of claim 1, wherein the cloud platform is configured to perform the operations, further comprising:

performing a factory equipment control operation, the factory equipment control operation comprising regulating and controlling the factory equipment in accordance with the optimized factory equipment parameters, so that the factory equipment has minimum energy consumption under an optimum production environment condition; and performing a production equipment monitoring operation, the production equipment monitoring operation comprising performing the optimized production schedule and monitoring the production equipment so that the production equipment has minimum energy consumption.

4. The hybrid system of carbon and energy management for green intelligent manufacturing of claim 1, wherein the cloud platform is configured to perform the operations, further comprising:

performing a microgrid power regulation operation, the microgrid power regulation operation comprising performing the optimized energy distribution for the plurality of power generation equipment of the factory in accordance with the energy distribution ratio so that the plurality of power generation equipment has minimum carbon emission.

5. The hybrid system of carbon and energy management for green intelligent manufacturing of claim 1, wherein performing a power trading platform bidding operation by the cloud platform when the judgment result of the collaborative work judgment operation is yes; and performing a carbon reduction confirmation operation by the cloud platform when the judgment result of the collaborative work judgment operation is no;

wherein the power trading platform bidding operation comprises performing a bidding of a power trading platform in accordance with the judgment result;

wherein the carbon reduction confirmation operation comprises confirming whether a microgrid power regulation operation meets a requirement of carbon reduction in accordance with the judgment result, if so, performing the carbon neutrality operation; otherwise, performing the intelligent factory planning operation again.

6. The hybrid system of carbon and energy management for green intelligent manufacturing of claim 5, further comprising:

a central dispatching platform communicatively connected to the cloud platform, and the central dispatching platform configured to perform the bidding of the power trading platform;

wherein the collaborative work of the virtual power plant configures the cloud platform to receive an available upper limit instruction from the central dispatching platform;

wherein the bidding of the power trading platform configures the cloud platform to perform a distributed energy resource (DER) dispatch and a demand control in accordance with the available upper limit instruction so as to realize power trading.

7. The hybrid system of carbon and energy management for green intelligent manufacturing of claim 1, wherein when the confirmation result of the net zero confirmation operation is no, the carbon neutrality operation is re-performed until the low-carbon energy allocation method complies with the net zero principle; and when the confirmation result of the net zero confirmation operation is yes, the low-carbon energy allocation method complies with the net zero principle.

8. A hybrid method of carbon and energy management for green intelligent manufacturing, comprising:

performing an information collection step, comprising configuring a plurality of cyber physical agents (CPAs) to collect a plurality of data sources, wherein the plurality of data sources comprise enterprise organization information, supervisory control and data acquisition (SCADA) information, microgrid information, environmental information and production line information, the SCADA information comes from factory equipment of a manufacturing device, and the production line information comes from production equipment of the manufacturing device;

performing an intelligent carbon management step, comprising:

performing a carbon disclosure step, comprising configuring a cloud platform to perform carbon inventory on the manufacturing device and obtain an inventory data, then the inventory data is provided to the plurality of cyber physical agents, and product raw material information corresponding to a product is generated, wherein the inventory data comprises a carbon emission;

performing a carbon reduction step, comprising configuring the cloud platform to improve a manufacturing process of the product in accordance with the product raw material information so as to reduce the carbon emission; and performing a carbon neutrality step, comprising realizing a net zero principle in accordance with a low-carbon energy allocation method when the carbon emission is not reduced through a product process planning at a present stage, wherein the low-carbon energy allocation method comprises a carbon credit or a carbon offset;

performing an intelligent energy management step, comprising:

performing an energy consumption prediction step, comprising configuring the cloud platform to predict an energy consumption of all equipment in a factory or the manufacturing device during a specific time period according to the data sources;

performing an intelligent factory planning step, comprising configuring the cloud platform to plan the product process planning with a minimum cost according to the energy consumption of the energy consumption prediction step and the carbon emission of the carbon reduction step, and an optimized factory equipment parameters and an optimized production schedule are planned in accordance with the product process planning; and performing an intelligent microgrid integration step, comprising formulating an optimal energy distribution for a plurality of power generation equipment of the factory in accordance with the product process planning so as to dynamically dispatch an energy distribution ratio of the plurality of power generation equipment within the specific time period;

performing a net zero confirmation step, comprising configuring the cloud platform to confirm whether the product process planning and the low-carbon energy allocation method comply with the net zero principle and generate a confirmation result, then decide whether to re-preform the carbon neutrality step in accordance with the confirmation result so as to realize the net zero principle; and performing a collaborative work judgment step, comprising configuring the cloud platform to judge whether to participate in the collaborative work of a virtual power plant and generate a judgment result, and determining to perform one of the intelligent factory planning step and the carbon neutrality step in accordance with the judgment result.

9. The hybrid method of carbon and energy management for green intelligent manufacturing of claim 8, wherein the enterprise organization information comprises manufacturing execution system (MES) information, enterprise resource planning (ERP) information and factory basic demand information;

the SCADA information comprises wastewater system information, pure water system information, air-conditioning system information, air pollution system information, factory environment information, intelligent meter information, wherein the wastewater system information, the pure water system information, the air-conditioning system information and the air pollution system information belong to information of the factory equipment;

the microgrid information comprises battery status information, power information, green energy power generation information and cogeneration information;

the environmental information comprises indoor environmental factor information, carbon inventory boundary information, gas inventory information and outdoor environmental factor information; and the production line information comprises sensor information, and the production line information belongs to information of the production equipment.

10. The hybrid method of carbon and energy management for green intelligent manufacturing of claim 8, further comprising:

performing a factory equipment control step, comprising configuring the cloud platform to regulate and control the factory equipment in accordance with the optimized factory equipment parameters, so that the factory equipment has minimum energy consumption under an optimum production environment condition; and performing a production equipment monitoring step, comprising configuring the cloud platform to perform the optimized production schedule and monitor the production equipment so that the production equipment has minimum energy consumption.

11. The hybrid method of carbon and energy management for green intelligent manufacturing of claim 8, further comprising:

performing a microgrid power regulation step, comprising configuring the cloud platform to perform the optimized energy distribution for the plurality of power generation equipment of the factory in accordance with the energy distribution ratio, so that the plurality of power generation equipment has minimum carbon emission.

12. The hybrid method of carbon and energy management for green intelligent manufacturing of claim 8, wherein performing a power trading platform bidding step by the cloud platform when the judgment result of the collaborative work judgment step is yes; and performing a carbon reduction confirmation step by the cloud platform when the judgment result of the collaborative work judgment step is no;

wherein the power trading platform bidding step comprises configuring the cloud platform to perform a bidding of a power trading platform in accordance with the judgment result;

wherein the carbon reduction confirmation step comprises configuring the cloud platform to confirm whether a microgrid power regulation step meets a requirement of carbon reduction in accordance with the judgment result, and if so, perform the carbon neutrality step; otherwise, perform the intelligent factory planning step again.

13. The hybrid method of carbon and energy management for green intelligent manufacturing of claim 12, wherein the collaborative work of the virtual power plant configures the cloud platform to receive an available upper limit instruction from a central dispatching platform; and the bidding of the power trading platform configures the cloud platform to perform a distributed energy resource (DER) dispatch and a demand control in accordance with the available upper limit instruction so as to realize power trading.

14. The hybrid method of carbon and energy management for green intelligent manufacturing of claim 8, wherein when the confirmation result of the net zero confirmation step is no, the carbon neutrality step of the intelligent carbon management step is re-performed until the low-carbon energy allocation method complies with the net zero principle; and when the confirmation result of the net zero confirmation step is yes, the low-carbon energy allocation method complies with the net zero principle.

\* \* \* \* \*